US007673662B2

(12) United States Patent
Owen

(10) Patent No.: US 7,673,662 B2
(45) Date of Patent: Mar. 9, 2010

(54) PLANER/SANDER WOOD MACHINE

(76) Inventor: Leslie John Owen, 30 Bennett Road, Thurgoona, New South Wales (AU) 2640

( * ) Notice: Subject to any disclaimer, the term of this patent is extended or adjusted under 35 U.S.C. 154(b) by 945 days.

(21) Appl. No.: 11/431,125

(22) Filed: May 9, 2006

(65) Prior Publication Data

US 2006/0257222 A1 Nov. 16, 2006

(30) Foreign Application Priority Data

May 9, 2005 (AU) .............................. 2005902332

(51) Int. Cl.
*B27C 5/00* (2006.01)
*B23Q 1/01* (2006.01)

(52) U.S. Cl. ...................... 144/134.1; 144/137; 409/202

(58) Field of Classification Search .............. 144/134.1, 144/135.2, 135.3, 136.95, 137; 409/86, 182, 409/202

See application file for complete search history.

(56) References Cited

U.S. PATENT DOCUMENTS 4,382,728 A * 5/1983 Anderson et al. ........... 409/137
4,468,160 A * 8/1984 Campbell, Jr. .............. 409/202
6,641,340 B1 * 11/2003 Hajjar et al. .................. 409/94

FOREIGN PATENT DOCUMENTS

| | | |
|---|---|---|
| DE | 198 10 333 | 9/1999 |
| EP | 1 027 952 | 8/2000 |
| WO | WO 2005/002787 | 1/2005 |

* cited by examiner

*Primary Examiner*—Shelley Self
(74) *Attorney, Agent, or Firm*—Richard M. Goldberg

(57) ABSTRACT

A guide for a machine tool or tool drive (7) means for moving a surfacing tool over the substantial surface of a work piece (1), said guide comprising a guide means adapted for positioning over said work piece, said guide means including two horizontal spaced apart guide rails (2) and a gantry (3) adapted for linear travel in an X-axis along said guide rails wherein said gantry includes a gantry rail (4) adapted to bridge said spaced apart guide rails, a pair of gantry arms (5) fitted to either end of said gantry rail each gantry arm having a gantry foot for co-operating with said guide rail wherein said tool drive (7) is fitted to said gantry by a gantry mount adapted for lateral movement along the length of said gantry Y-axis, said mount including a vertical Z-axis height adjustment face plate (9) for mounting said tool drive wherein the fitting of said gantry rail to said guide rails is adjustable about said X-axis and the fitting of said tool drive to said gantry mount is adjustable about said Y-axis such that the cutting face of a tool fitted to said drive can be adjusted to correspond to the surface on planar face of said work piece without the need to clamp said work piece to said guide.

7 Claims, 6 Drawing Sheets

1
2
3
4
5
6
7
8
11
16
18
19
24
28
29
31
32
33
34
35
X
Y

FIG. 6.
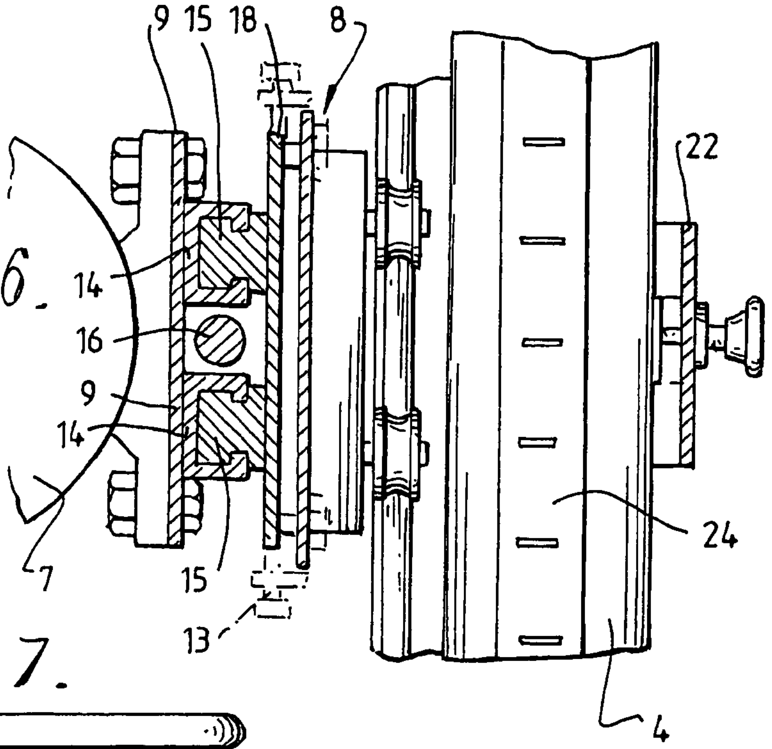
FIG. 7.
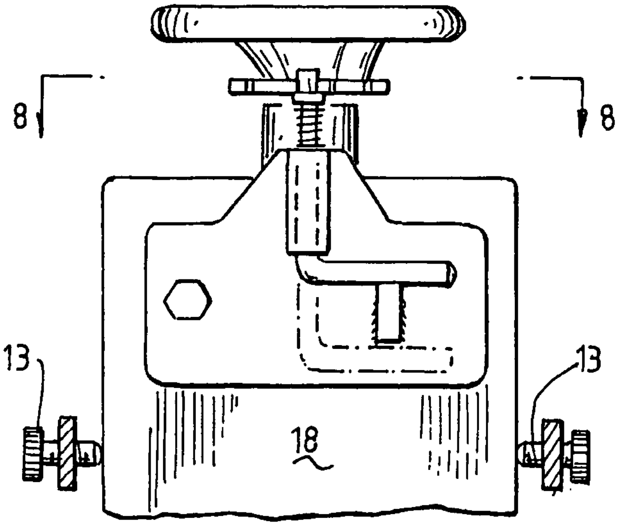
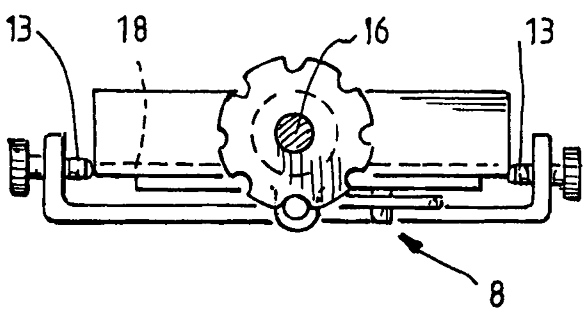
FIG. 8.
FIG. 9.
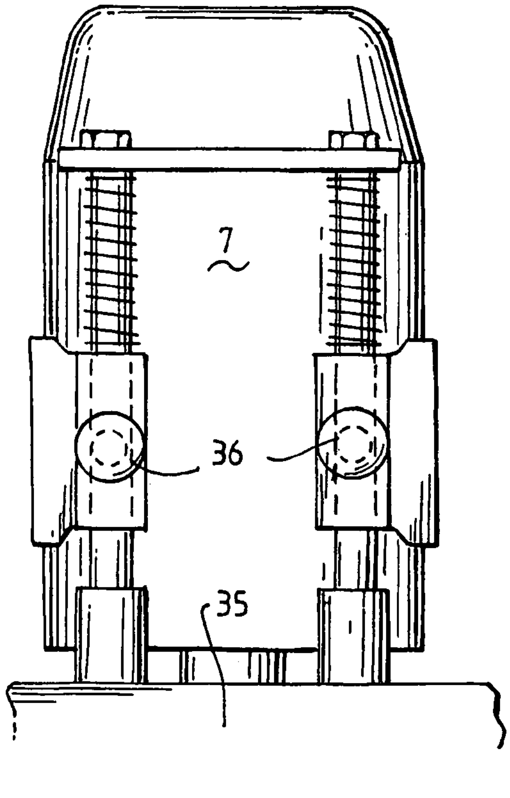

PLANER/SANDER WOOD MACHINE

CROSS-REFERENCE TO RELATED APPLICATIONS

The present application claims priority from Australian Provisional Patent Application No 2005902332 filed on 9 May 2005, the content of which is incorporated herein by reference.

INTRODUCTION TO THE INVENTION

This invention relates to a machine tool of the type designed to service large work pieces, and in particular work pieces of the type found in large slabs of timber where substantial expanses of a work piece require machining and levelling to a high degree of accuracy.

BACKGROUND TO THE INVENTION

The machining of large pieces of wood or wood related material, particularly of a type which occur when large slabs or flitches of timber require machining, pose particular problems for the machinist if a refined or high level of machining and finish are required of the finished product of the tool. Traditionally timber logs are prepared in a timber mill by way of large band sawing operations or small scale operations including preliminary machining which can be accomplished by chainsaw mills. Such mills are readily available and provide a tracking or guide system for operating a chainsaw such as a horizontally positioned log or piece of work can be sawn horizontally into a series of slabs by the controlled movement and guiding of a large chainsaw with the use of an apparatus known as a chainsaw mill.

While such machining accomplishes a task of reducing a wooden log to a series of slabs or flitches, the very nature of chainsaw mill operations and even industrial band saw mills results in a very rough and preliminary machining finish which leaves the task for the furniture builder or cabinet maker to dress the slab product into a more suitable form for production of furniture and the like. Such machining is traditionally accomplished by way of joiners and thicknesses, which plane the surface of a wooden slab to the required dimensions. Similarly drum sanding devices can accomplish a similar result. However, such devices when put to the task of machining large dimensions of slabs of timber result in very heavy duty and expensive apparatus which is not readily available outside of the commercial and industrial sphere. One object of the invention is to provide an improved guide for a machine tool or a tool drive adapted for surface dressing and finishing large slabs of timber or similar products where the guide can be readily adjusted and fine tuned to control the action of a cutting tool and/or sanding tool.

Whilst prior art machines are available for mounting cutting and sanding tools in the manner of the machine described above; when large cutting tools are used or sanding disks having a substantial surface or working area in contact with the work piece, prior art tools are often found to be deficient particularly in their inability to fine tune and very precisely align the working face of the tool in a plane corresponding precisely with the plane of the work piece in question.

One object of the invention is to provide an improved machine tool guide.

SUMMARY OF THE INVENTION

In a first aspect the invention provides a guide for a machine tool or tool drive for moving a surfacing tool over the substantive surface of a work piece said guide comprising a guide means adapted for positioning over said work piece, said guide means including two horizontal spaced apart guide rails and a gantry adapted for linear travel along said guide rails along an X axis wherein said gantry includes a gantry rail adapted to bridge said spaced apart guide rails, a pair of gantry arms fitted to either end of said gantry rail each having a gantry foot for cooperating with said guide rail wherein said tool drive is fitted to said gantry by a gantry mount adapted for lateral movement along the length of said gantry in a Y axis, said mount including a vertical Z axis height adjustable face plate for mounting said tool drive wherein the fitting of said gantry rail to said guide rails is adjustable about said X axis and the fitting of said tool drive to said gantry mount is adjustable about said Y axis such that the cutting face of a tool fitted to said drive can be adjusted to correspond to the surface planar face of said work piece without the need to clamp said work piece to said guide. The adjustment of said gantry rail is provided by slots formed coaxially in a terminal shoe fitted to either end of said gantry rail. The shoe is fitted to the gantry arms by fasteners passing through said slots. The adjustment of the tool drive may be provided by lateral bolts or similar devices acting between the gantry mount and the face plate.

BRIEF DESCRIPTION OF THE DRAWINGS

The invention will be described with reference to the following figures and legend.

FIG. 6 Shows a sectional plan view taken on line 6-6 on FIG. 5 showing bearing and plate arrangement;

FIG. 7 Shows a sectional view on line 7-7 on FIG. 5 illustrating means locking height adjustment;

FIG. 8 Shows a sectional plan view on line 8-8 on FIG. 7;

FIG. 9 Shows a view taken on line 9-9 on FIG. 5, showing the height adjustment for work tool;

DETAILED DESCRIPTION

Legend

Figure 1:
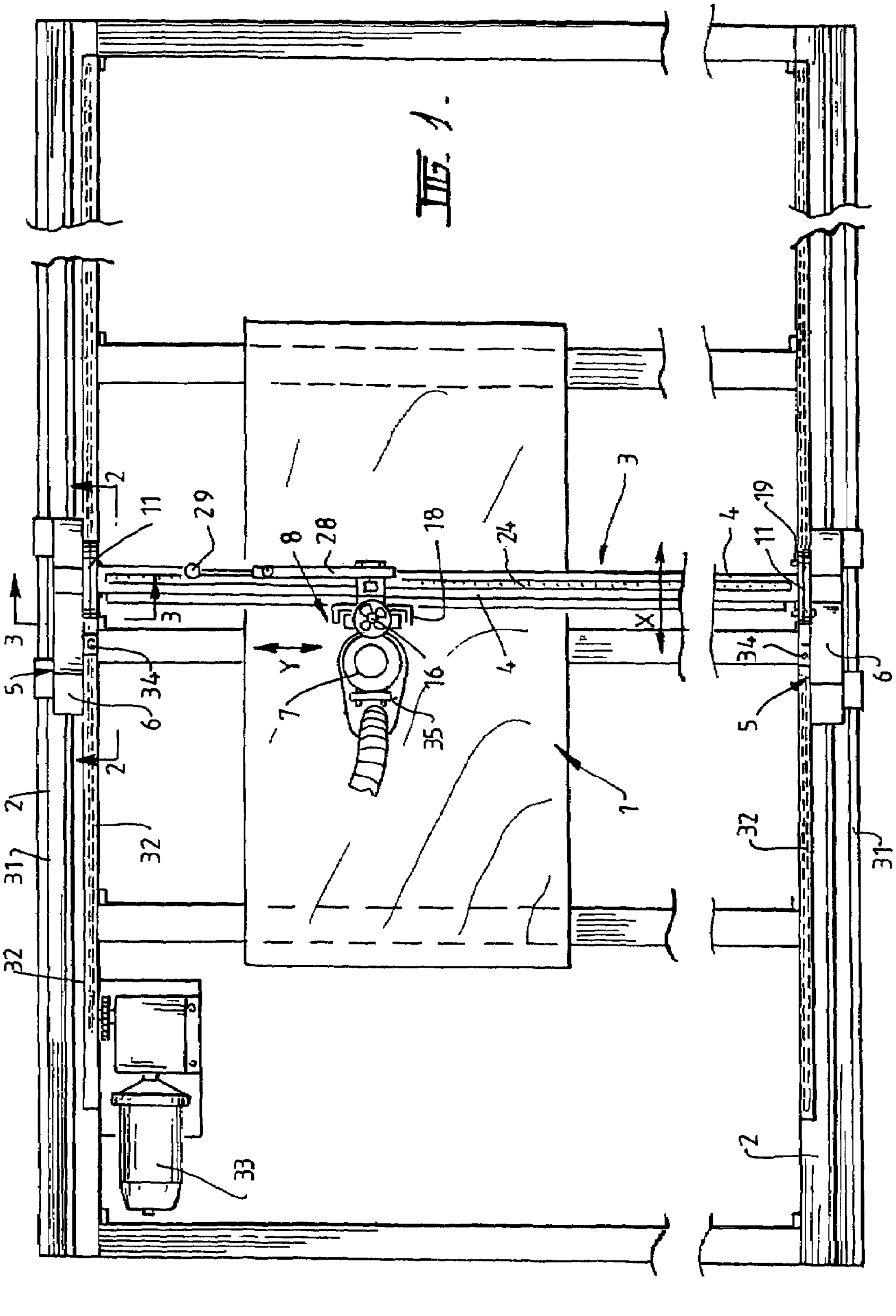
FIG. 1 Shows a plan view of the machine.

1. Work piece
2. Horizontal guide rails
3. Gantry
4. Gantry rail
5. Gantry arm
6. Gantry foot
7. Tool drive
8. Gantry mount
9. Face plate
11. Gantry rail shoe
12. Slots
13. Lateral bolts
14. Linear bearings
15. Bearing tracks
16. Height control screw
17. Lifting lug
18. Back plate
19. Fastener

20. Rotation stop
21. Stop screws
22. Gantry mount housing
23. Locking pin
24. Calibration rack
25. Height control handle
26. Locking key
28. Cross travel control arm
29. Extendable handle
31. Rail lip
32. Gantry drive chain
33. Linear drive motor
34. Power feed lock
35. Dust boot
37. Hold down bearing
38. Lateral bearings
39. Load bearings Referring firstly to FIG. 1, 2 and 3 the invention provides a guide for a tool drive where the tool drive (not shown) is particularly adapted for receiving and operating a large surface area tool either in the form of a cutter or a sanding disk where a substantial surface area of the tool is brought into contact for machining and working the work piece. In particular where a sanding disk is brought to bear on the work piece by way of the type of guide detailed in the invention the very particular and exquisite alignment of the planar surface of the sanding disk to the planar surface of the work piece in the X and Y dimensions is very important in establishing efficient and effective operation of the tool where any deviation of the working surface or working path of the tool from the planar surface of the work piece immediately reduces the quality of the finish and greatly reduces the efficiency and operation of the tool in question. Moreover, when a large surfacing tool is drawn across the surface of a work piece a high degree of rigidity and control is required to maintain the tool in accurate alignment with the work piece. FIG. 1 shows a general plan overview of the guide with a work piece 1 in situ within the confines of the guide. The guide means includes two horizontal guide rails 2 positioned either side of the work piece 1 and over which are bridged a gantry 3 which is designed for linear travel in the X direction back and forth along the length of the guide rails. The gantry 3 includes a gantry rail 4 adapted to bridge spaced apart guide rails 2. The gantry rail is supported by a pair of gantry arms 5 which are adapted to be fitted to either end of the gantry rail. Each gantry arm has a gantry foot 6 particularly is achieved by way of roller bearings 37, 38 and 39. The tool drive 7 is provided by way of a suitably sized electric drive motor which is fitted to the gantry by way of a gantry mount 8 shown in FIG. 5. The gantry mount 8 is adapted for lateral movement backwards and forwards along the length of the gantry by way of suitable roller bearings attached to cooperate with the gantry rail 4. The movement back and forth along the gantry rail is in the Y axis and provides movement for the drive 7 in the Y axis.

Figure 5:
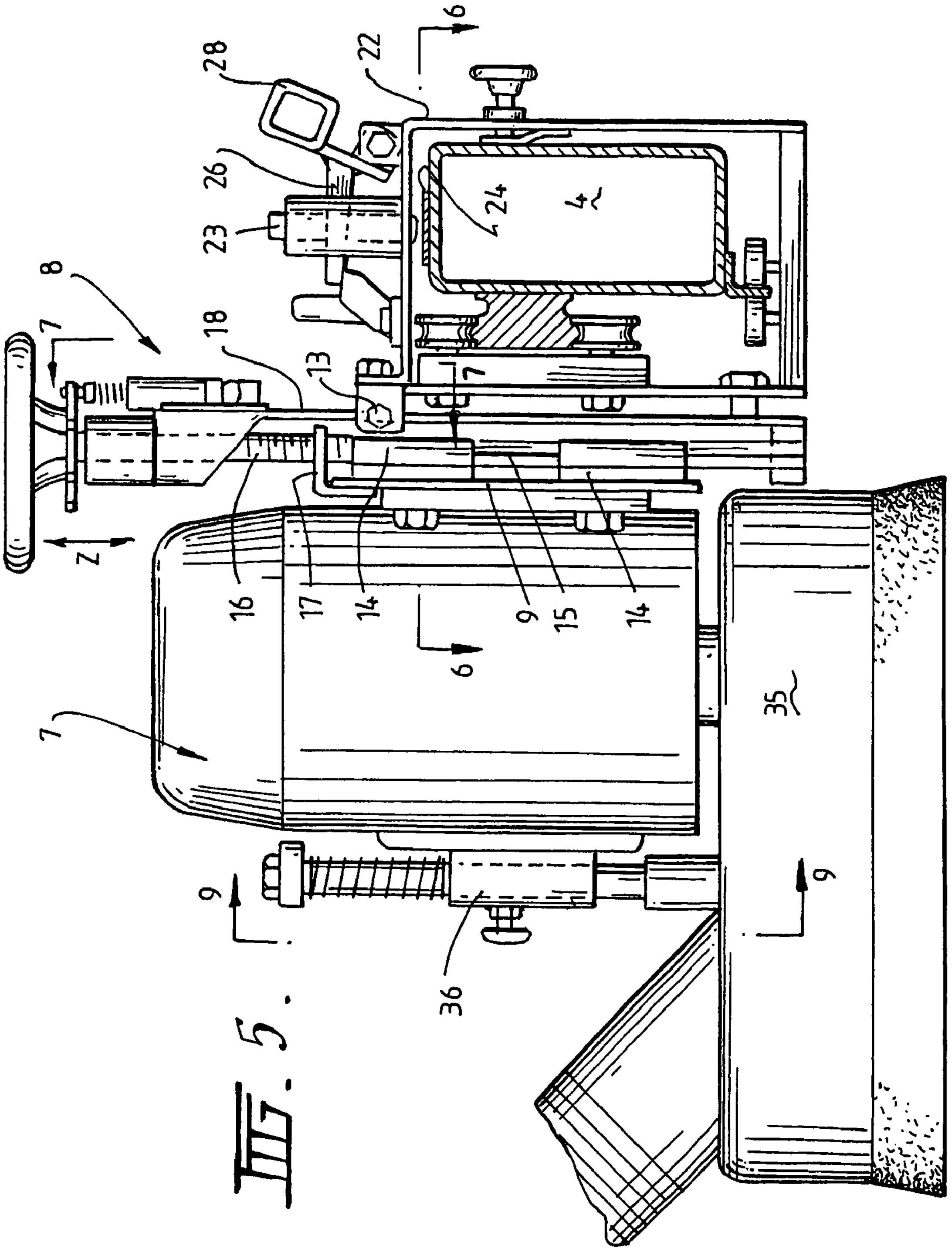
FIG. 5 Shows a side view taken on line 5-5 on FIG. 4 of the tool drive and attachment to the Gantry Rail.

Referring now to FIGS. 5 and 6 a height adjustment mechanism for the drive 7 is shown which is adapted for fitting to the gantry mount 8. The drive height adjustment mechanism includes face plate 9 for mounting the drive where the face plate is attached to linear bearings 14 which in turn slide on dual bearing tracks 15. The linear bearings are fitted to a height control screw 16 by way of a lifting lug 17. The linear bearing tracks and drive height adjustment mechanism are fitted to a back plate 18 with the back plate rotatably fitted to the gantry mount 8. The rotation of the back plate is controlled by lateral bolts 13 which provide exquisite control and locking of the gantry mount in the y-axis.

Figure 2:
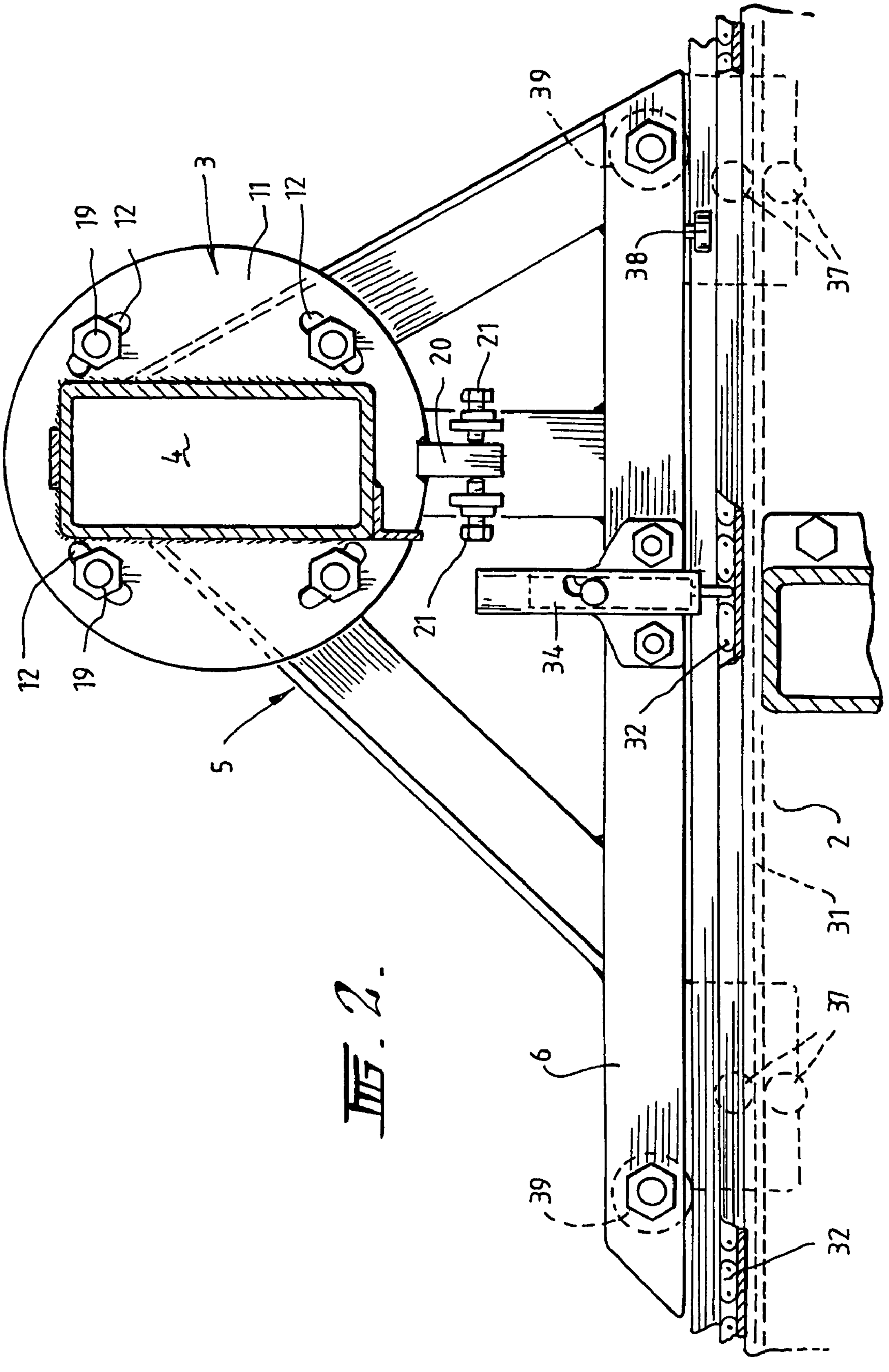
FIG. 2 Shows a side view of Gantry taken on line 2-2 on FIG. 1.
Figure 3:
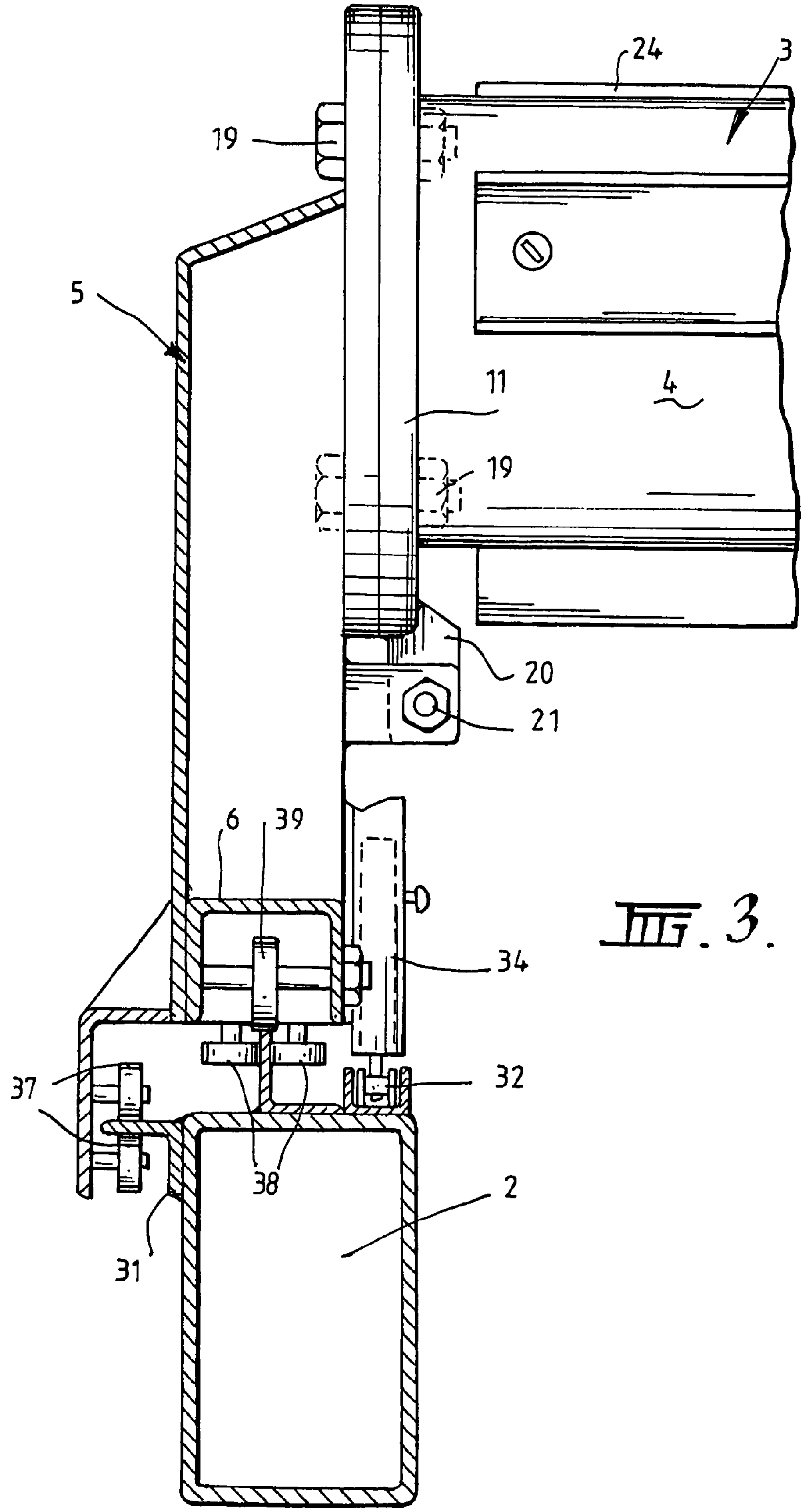
FIG. 3 Shows a sectional view taken on line 3-3 on FIG. 1 of Gantry components.

The particular features of the invention that provide the guide with the precise adjustment in both the X and Y axes is shown firstly with reference to FIG. 2 where a close up underside view of the gantry shows the gantry rail terminating in a gantry rail shoe 11. The gantry rail shoe is duplicated at the other end of the gantry rail and each shoe is provided with a plurality of peripheral slots 12 which are adapted to receive a fasting means 19 either in the form of a bolt or other fixing means whereby the gantry rail 4 is provided with a means of rotation about a central axis so as to vary the pitch or alignment of the drive attached to the gantry rail along the X axis. The rotational movement of the gantry rail 4 is controlled by way of a rotation stop 20 provided with stop screws 21 which allow precise alignment of the gantry rail along the X axis.

Referring now to FIGS. 7, 8 and 9 the adjustment of the gantry mount about the Y axis is shown where the fixing of the vertical height assembly comprising the back plate 18 and face plate (not shown) by way of the back plate being fitted to the gantry mount such that the fitting bolts have sufficient leeway that lateral movement is compensated and controlled by dual lateral bolts 13 fitted to the gantry mount so as to act on the back plate 18 thereby causing alignment thereof in the Y axis.

Figure 4:
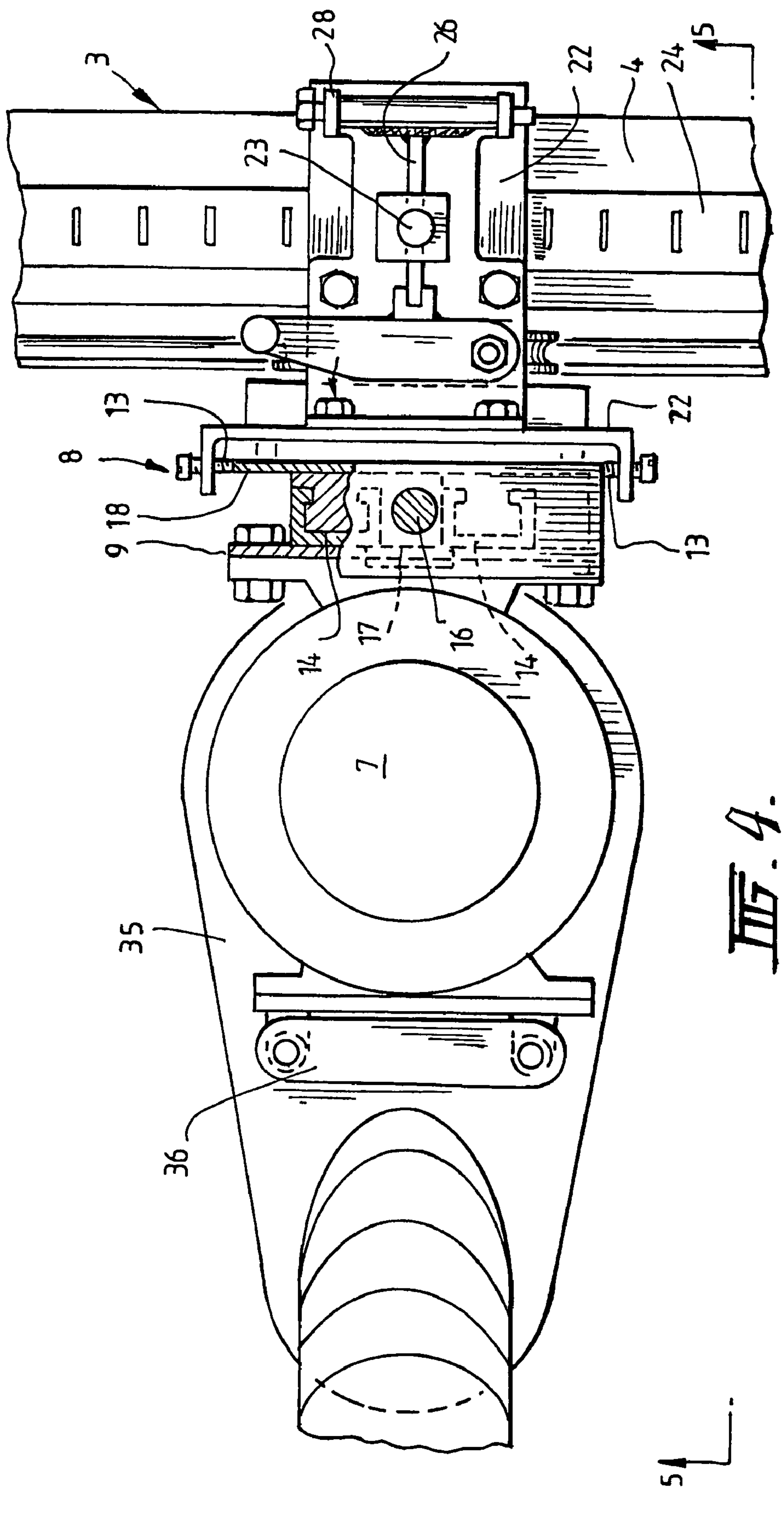
FIG. 4 Shows an enlarged plan view of the tool drive attachment to the Gantry Rail.

Referring to FIGS. 4 and 5 other aspects of the invention include a gantry mount housing 22 which is adapted to directly cooperate with the gantry rail 4. The gantry mount housing includes a spring based locking pin 23 which is adapted to cooperate with a calibrated gantry rail rack 24 positioned on top of the gantry rail such that the movement of the gantry mount can be arrested in the Y axis.

The manual movement of the gantry 3 along the X axis can be controlled by the cross travel control arm 28. The cross travel control arm has an extendible handle 29 which is telescopically connected to the cross travel control arm. The control arm 28 is pivotable such that it can be rotated about its longitudinal axis to activate a locking key 26 which engages or disengages the locking pin 23

Referring again to FIGS. 2 and 3 an overall perspective view of the guide from outside the guide rails 2 is shown where the outside of the guide rail is provided with a rail lip 31 such that the gantry foot 6 can be provided with hold down bearings 37 such that the gantry foot can be securely held down onto and into close and precise engagement with the guide rails 2. The hold down bearings are augmented with lateral bearings 38 and load bearings 39, ensuring accurate and precise action for the gantry.

FIG. 1 shows the gantry drive chain 32 which is positioned for enclosed movement longitudinally along the guide rails 2 with the linear drive motor 33 positioned at one end of the guide. The means by which the gantry is locked to the gantry drive chain is shown with the power feed lock 34 positioned for actuation so as to lock the gantry foot into the gantry drive chain thereby ensuring accurate and positive drive of the gantry along the X axis.

FIGS. 5 and 9 shows another feature of the invention relating to the drive motor's ability to readily accept cutting tools and sanding tools whereby a dust boot 35 is provided for fitting to the drive 7 and the dust boot is vertically adjustable by way of thumb screws. In this manner regardless of which tool is required be it either a cutter which is used first for surfacing the work piece or sanding machine which is required for subsequent smoothing the dust boot can be readily adjusted to accommodate whichever type of tool is required for fitting to the drive.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A machine tool guide for moving a surfacing tool over a substantial surface of a work piece, said machine tool guide adapted for positioning over the work piece, said guide comprising:

two horizontal spaced apart guide rails, a gantry adapted for linear travel in an X-axis along said guide rails, said gantry including a gantry rail adapted to bridge said spaced apart guide rails, and a pair of gantry arms fitted to either end of said gantry rail, each gantry arm having a gantry foot for co-operating with a respective said guide rail, and a gantry mount for fitting a tool drive to said gantry for lateral movement along a length of said gantry along a Y-axis, said gantry mount including a vertical Z-axis height adjustment face plate for mounting said tool drive, wherein fitting of said gantry rail to said guide rails is adjustable about said X-axis and fitting of said tool drive to said gantry mount is adjustable about said Y-axis such that a cutting face of a tool fitted to said tool drive can be adjusted to correspond to a surface of a planar face of said work piece without the need to clamp said work piece to said guide, wherein said gantry mount includes a cross travel control and a calibrated gantry rail track adapted to assist in manual control of said gantry, said cross travel control comprising a moveable locking pin slidably fitted to said gantry mount for movement between an unlocked position clear of said calibrated gantry rail track and a locking position adapted to co-operate with said calibrated gantry rail track for releasably locking said gantry mount incrementally along the length of said gantry.

2. A guide according to claim 1 further comprising a terminal shoe fitted to either end of said gantry rail, and slots formed coaxially in the terminal shoe for adjusting said gantry rail.

3. A guide according to claim 1 wherein said gantry rail has a sufficient footprint to provide smooth and accurate movement of said gantry arms along said X-axis.

4. A guide according to claim 1 further comprising a continuous drive adapted for linear movement parallel to said guide rails, and said gantry includes a locking arrangement for cooperation with said drive to provide power activation of said gantry.

5. A machine tool guide for moving a surfacing tool over a substantial surface of a work piece, said machine tool guide adapted for positioning over the work piece, said guide comprising:

two horizontal spaced apart guide rails, a gantry adapted for linear travel in an X-axis along said guide rails, said gantry including a gantry rail adapted to bridge said spaced apart guide rails, and a pair of gantry arms fitted to either end of said gantry rail, each gantry arm having a gantry foot for cooperating with a respective said guide rail, and a gantry mount for fitting a tool drive to said gantry for lateral movement along a length of said gantry along a Y-axis, said gantry mount including a vertical Z-axis height adjustment face plate for mounting said tool drive.

wherein fitting of said gantry rail to said guide rails is adjustable about said X-axis and fitting of said tool drive to said gantry mount is adjustable about said Y-axis such that a cutting face of a tool fitted to said tool drive can be adjusted to correspond to a surface of a planar face of said work piece without the need to clamp said work piece to said guide, wherein said gantry mount includes a cross travel control and a calibrated gantry rail track adapted to assist in manual control of said gantry, said cross travel control comprising a moveable locking pin slidably fitted to said gantry mount for movement between an unlocked position clear of said calibrated gantry rail track and a locking position adapted to co-operate with said calibrated gantry rail track for releasably locking said gantry mount incrementally along the length of said gantry, wherein said control further includes a locking key pivotally attached to said gantry mount for operably driving said locking pin and an elongate control arm fitted to said locking key and telescopically extendable to reach across the length of said gantry rail to operably drive said locking key.

6. A guide according to claim 1 wherein said gantry mount includes a rotatably mounted back plate with lateral bolts adapted to bear upon said back plate to adjust and lock said back plate about a rotational axis thereof for adjustment about said y-axis.

7. A guide according to claim 2 wherein said terminal shoe of said gantry rail is provided with a rotational stop lug adapted to move between two stop screws and allow adjustment of said gantry about said x-axis.

* * * * *